United States Patent
Sinha et al.

(10) Patent No.: US 9,451,649 B2
(45) Date of Patent: Sep. 20, 2016

(54) DEVICE AUTO PAIRING WITHOUT TOUCH AND TAP

(71) Applicant: Google Technology Holdings LLC, Mountain View, CA (US)

(72) Inventors: Rohit R. Sinha, Grayslake, IL (US); Naveen Aerrabotu, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/816,759

(22) Filed: Aug. 3, 2015

(65) Prior Publication Data

US 2016/0037574 A1 Feb. 4, 2016

Related U.S. Application Data

(63) Continuation of application No. 14/033,534, filed on Sep. 23, 2013, now Pat. No. 9,100,943.

(51) Int. Cl.
| | |
|---|---|
| H04W 4/00 | (2009.01) |
| H04W 76/02 | (2009.01) |
| H04M 1/725 | (2006.01) |
| H04W 8/00 | (2009.01) |

(52) U.S. Cl.
CPC ......... H04W 76/023 (2013.01); H04M 1/7253 (2013.01); H04W 4/008 (2013.01); H04W 8/005 (2013.01)

(58) Field of Classification Search
CPC .......................... H04W 4/008; H04B 5/0031
USPC ...................... 455/41.1, 41.2, 41.3
See application file for complete search history.

(56) References Cited

U.S. PATENT DOCUMENTS

| | | | |
|---|---|---|---|
| 2007/0123166 A1* | 5/2007 | Sheynman .......... | H04M 1/7253 455/41.2 |
| 2009/0176451 A1* | 7/2009 | Yang .................... | H04W 99/00 455/41.2 |
| 2011/0210830 A1* | 9/2011 | Talty ................... | H04B 5/0031 340/10.51 |
| 2012/0100803 A1* | 4/2012 | Suumaki ............ | H04W 36/0072 455/41.1 |
| 2012/0268238 A1* | 10/2012 | Park ..................... | G07F 15/006 340/5.8 |
| 2013/0311692 A1* | 11/2013 | Huang ................. | H04M 1/723 710/303 |
| 2014/0273845 A1* | 9/2014 | Russell .............. | H04W 76/023 455/41.2 |
| 2014/0315487 A1* | 10/2014 | Lu ........................ | H04B 5/02 455/41.1 |

* cited by examiner

*Primary Examiner* — Wen Huang
(74) *Attorney, Agent, or Firm* — Byrne Poh LLP (57) ABSTRACT

A device-to-device (D2D) pairing assembly comprises: a first and a second device detecting and communicating (DDC) component communicatively coupled to each other and to a microprocessor that executes a device pairing parameter exchange (DPPE) utility, which configures the D2D pairing assembly to: detect a communicative coupling of a first user device to the first DDC component; receive from the first user device at least one first pairing parameter, which first pairing parameter enables another device to connect to and participate in a pairing session with the first user device; detect a communicative coupling of a second user device to the second DDC component; and communicate the at least one first pairing parameter to the second user device, via the second DDC component, to trigger the second user device to connect to and participate in a pairing session with the first user device via a direct device-to-device communication channel.

19 Claims, 5 Drawing Sheets

DEVICE AUTO PAIRING WITHOUT TOUCH AND TAP

CROSS-REFERENCE TO RELATED APPLICATIONS

This application is a continuation of U.S. patent application Ser. No. 14/033,534, filed Sep. 23, 2013, which is hereby incorporated by reference herein in its entirety.

BACKGROUND

1. Technical Field

The present disclosure generally relates to pairing of user devices and in particular to a mechanism and improved method for pairing of two user devices.

2. Description of the Related Art

Personal electronic devices or user devices, such as smart phones, tablets, and others are widely utilized for generating, storing, and/or communicating data and other content. A large number of these devices include the capability, via use of a pairing mechanism and pairing utility, to communicatively connect the user device to a second device and exchange content. Content on the first device can then be shared with the second device via a pairing scheme involving the two devices being placed in proximity to each other and communicating over a pairing or communication channel using short-range communication technology, such as near field communication (NFC), or Bluetooth®, or infrared (IR). Conventionally, the pairing of two user devices can require an exchange of one or more pairing parameters, such as device authentication credentials, before each of the user devices is able to access the other device and receive the content from the other device. Additionally, the establishment of the pairing channel requires a series of user inputs and/or interactions with the devices to first enter into a pairing mode and then to establish the pairing channel. This setup of the devices for pairing can be time consuming and/or cumbersome, even with the availability of the touch and tap connection methodology available with some of the more sophisticated user devices.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

The illustrative embodiments of the present disclosure provide a method and a device-to-device (D2D) pairing assembly for facilitating pairing of a first user device with a second user device. The D2D pairing assembly comprises: a first device detecting and communicating (DDC) area having corresponding first DDC components; a second DDC area having corresponding second DDC components communicatively coupled to the first DDC components; and a microprocessor communicatively coupled to the first DDC component and to the second DDC component. A device pairing parameter exchange (DPPE) utility configures the D2D pairing assembly to: detect a communicative coupling of a first user device to the first DDC component; in response to detecting the communicative coupling of the first user device, receive from the first user device at least one first pairing parameter provided by a pairing application executing on the first user device, which first pairing parameter enables another device to connect to and participate in a pairing session with the first user device; detect a communicative coupling of a second user device to the second DDC component; and communicate the at least one first pairing parameter to the second user device, via the second DDC component, to trigger the second user device to connect to and participate in a pairing session with the first user device via a direct device-to-device pairing communication channel.

In one embodiment, the D2D pairing assembly detects either (i) a physical placement of the first user device on the first DDC area or (ii) detects the first user device coming into proximity of and/or within communication range of the first DDC area. Similarly, the D2D pairing assembly detects either a physical placement of the second user device on the second DDC area or detects the second user device coming into proximity of and/or within communication range of the second DDC area.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 1:
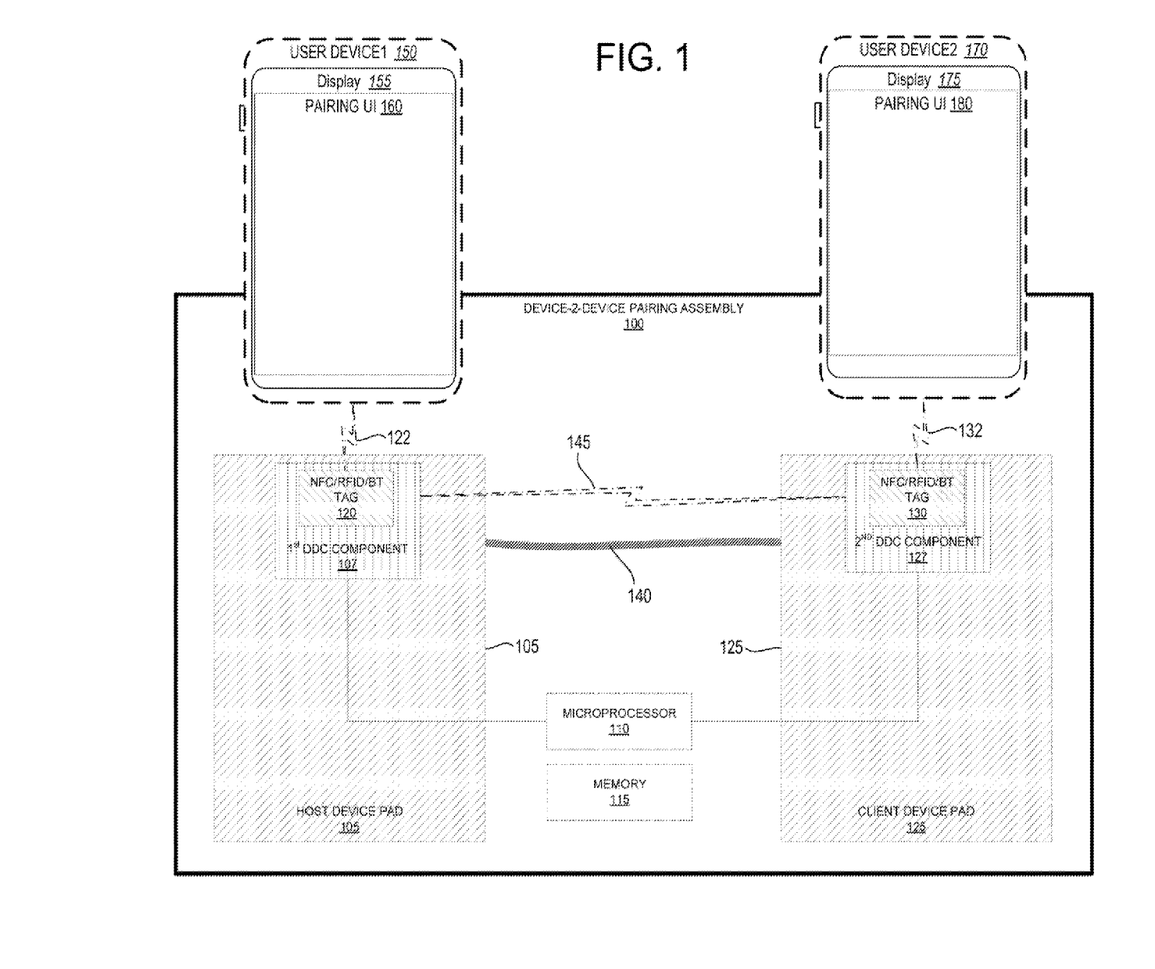
FIG. 1 provides a block diagram representation of an example device-to-device (D2D) pairing assembly with communicatively connected device detection and communication (DDC) areas for receiving and communicating with respective user devices, according to one embodiment.

Referring now to FIG. 1, there is illustrated a device-to-device (D2D) pairing assembly 100 comprising: a first device detecting and communicating (DDC) area 105, also referenced as host device pad 105, and a second DDC area 125, also referenced as client device pad 125. Use of the terminology host device pad 105 and client device pad 125 identifies a specific embodiment in which first DDC area 105 is allocated for receiving the user device that will be utilized as the host device within a pairing scheme, while second DDC is allocated for receiving the second user device that will be the client device within the pairing scheme. For consistency, the device that is placed or brought into proximity with first DDC area 105 is referred to as the first user device, represented as first user device 150. The first and second DDC areas 105 and 125 can, in one or more implementations, represent areas delineated on the D2D pairing assembly 100 for (a) direct physical placement of a first user device 150 and a second user device 170 or (b) close proximity placement of the first user device 150 and the second user device 170, respectively, within communication range of the corresponding transceivers (see FIG. 2).

As shown, located within first DDC area 105 is a corresponding first DDC component 107, which includes or comprises a short-range communication component or tag 120. Similarly, located within second DDC area 125 is a corresponding second DDC component 127, which includes or comprises another short-range communication component or tag 130. As shown, first and second DDC components 107 and 127 are both configured with one or more wireless communication mechanisms, respectively illustrated as near field communication (NFC)/radio frequency identification (RFID)/Bluetooth (BT) tags 120 and 130. The first and second DDC components 107 and 127 enable the D2D pairing assembly 100 to communicatively connect with the user devices 150 and/or 170, respectively, via a short-range wireless communication 122, 132.

As further illustrated, D2D pairing assembly 100 can include a microprocessor 110 and one or more storage devices, represented by memory 115. According to one embodiment, microprocessor 110 and memory 115 can generally exist externally to first and second DDC areas 105 and 125 and operate as components of D2D pairing assembly 100. With this embodiment, microprocessor 110 is communicatively coupled to the first DDC component 107 and to the second DDC component 127. Each of first DDC component 107 and second DDC component 127 includes one or more mechanisms for communicating between the two components 107 and 127. As shown, the second DDC component 127 is communicatively coupled to the first DDC component 107 via one of a wired cable connector 140 or a wireless medium 145 using one of the available close-range wireless communication protocols and supporting devices. It is appreciated that there is no specific requirement of a space separation between first DDC component 107 and second DDC component 127. The two DDC components 107 and 127 can be adjacent to each other, positioned in a vertical alignment (top-and-bottom or back-to-back) or in other positions relative to each other within the D2D pairing assembly 100.

Figure 2:
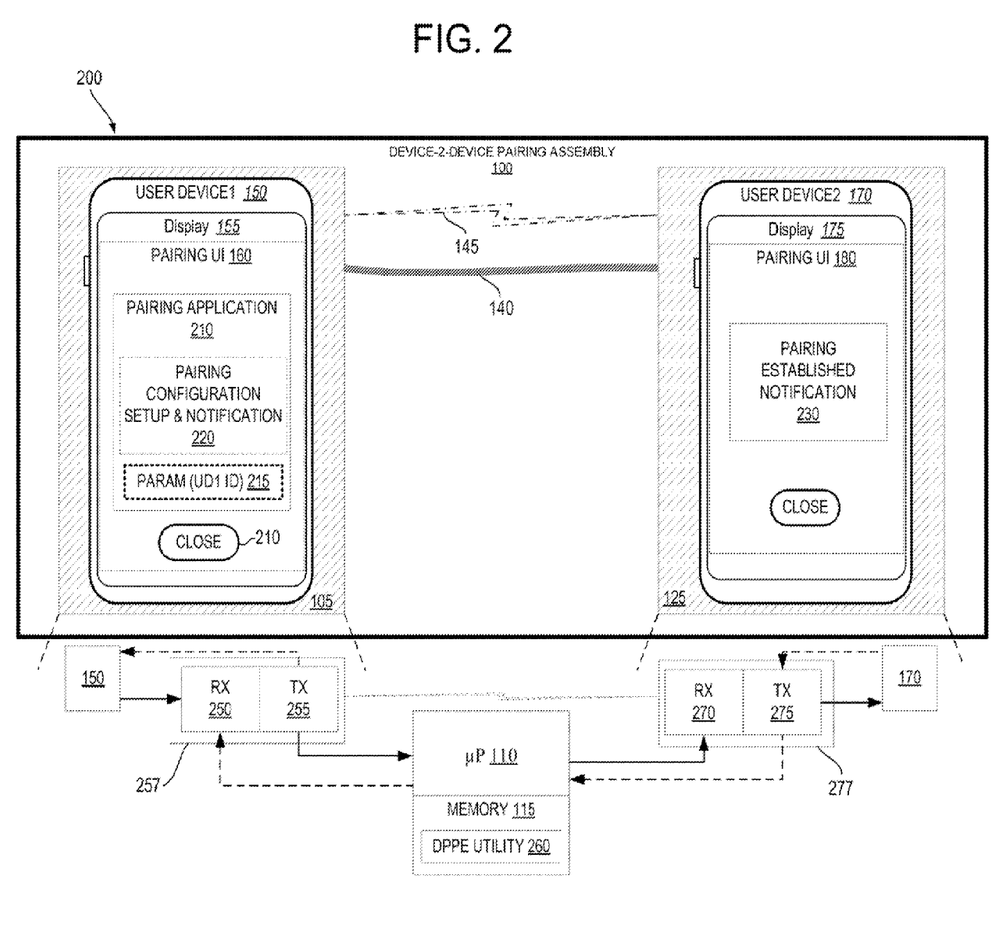
FIG. 2 is a block diagram representation of components utilized to enable the content transfer aspects of a D2D pairing assembly when a first user device and a second user device are placed on, or in proximity to, a respective DDC area, according to one or more embodiments.

Referring now to FIG. 2, there is provided an in-use view presenting a more detailed representation of D2D pairing assembly 100 with the two user devices, first user device 150 and second user device 170, each placed physically on top of first DDC area 105 and second DDC area 125, respectively, and engaging in communication exchange via D2D pairing assembly 100. Unlike in FIG. 1 where the user devices 150 and 170 are shown physically displaced from the first and second DDC areas 105 and 125, each user device 150 and 170 of FIG. 2 is physically placed atop a respective DDC area 105 and 125. By extension, the user devices 150 and 170 are also in close proximity to respective first DDC components 107 and 127. In at least one embodiment, the physical contact of at least the first user device 150 with the corresponding first DDC component 105 triggers the various pairing setup functions described herein. In alternate embodiments, the physical contact of both first user device 150 and second user device 170 with respective first DDC component 105 and second DDC component 125 (as represented by FIG. 2) is required to trigger the pairing setup functions. In one embodiment, the location of the DDC components 107 and 127 within the DDC areas 105 and 125 are pre-determined to provide unobstructed communication with the transceiver components of the user devices that are placed atop the DDC areas 105 and 125.

As further shown by FIG. 2, D2D pairing assembly 100 comprises: an underlying pad 200 that identifies a perimeter and a surface of the D2D pairing assembly 100; a first DDC area 105 on which the first user device can be placed; and a second DDC area 125 on which the second user device can be placed. D2D pairing assembly 100 also comprises functional electronic circuitry associated with the first and second DDC components 107 and 127, which enable at least one of a wireless signal communication (145) between the first DDC component 107 and the second DDC component 127 and direct communication via a communication bus 140 extending between the first DDC component 107 and the second DDC component 125. Several of the additional, internal functional components of D2D pairing assembly 100 are illustrated at the bottom section of FIG. 2. These functional electronic circuitry components are illustrated in communication with each other, as with an example in-use case, with communication lines presented by directional arrows. Dashed arrows indicate optional and/or alternate communications that can occur in some embodiments, but excluded in others.

According to the illustrated embodiment, the electronic circuitry comprises: a first DDC data transmitter 255 that transmits pairing parameters (215) received from the first user device 150; and a second DDC data receiver 270 for receiving the pairing parameters (215) being transmitted from the first device pad 105. In one or more embodiments, the first DDC data transmitter 255 is a component of a first DDC data transceiver 257 and the second DDC data receiver 270 is a component of a second DDC data transceiver 277. The transceivers 257, 277 enable bi-directional transfer of pairing information between a first user device and a second user device communicatively coupled to respective ones of the first DDC component 105 and the second DDC component 125.

Accordingly, in one or more embodiments, the first DDC component 107 comprises a first data receiver and a first data transmitter, which respectively receives the pairing parameters and transmits the received pairing parameters to the second DDC component 127. Further, the second DDC component 127 comprises a second data receiver that receives the pairing parameters from the first DDC component 107 and a second data transmitter that transmits the pairing parameters to the second user device 170 from the second DDC component 127.

In the various embodiments, the first data receiver can be one of a radio frequency identifier (RFID) receiver and a near field communication (NFC) receiver. Similarly, the second data transmitter can be one of a radio frequency identifier (RFID) transmitter and a near field communication (NFC) transmitter.

FIG. 2 illustrates a different configuration of microprocessor 110 and memory 115 introduced in FIG. 1. With this configuration, memory 115 is depicted as an on-chip memory with microprocessor 110. To support and trigger or enable the functions described herein, microprocessor 110 is configured with a device pairing parameter exchange (DPPE) utility 260 that executes on the microprocessor 110 and configures the D2D pairing assembly 100 to perform a series of functions to assist in pairing of two or more user devices, such as first user device 150 and second user device 170. According to one embodiment, DPPE utility 260 can be stored within memory 115 and accessed for execution on microprocessor 110 when required, e.g., when microprocessor 110 is triggered to perform the device pairing configuration processes.

According to one or more embodiments, DPPE utility 260 configures the D2D pairing assembly 100 to detect a communicative coupling of a first user device 150 to the first DDC component 107; and in response to detecting the communicative coupling of the first user device 150, receive from the first user device 150 at least one first pairing parameter (e.g., user device ID 215) provided by a pairing application 210 executing on the first user device 150. The provided first pairing parameter enables another device to connect to and participate in a pairing session with the first user device 150. The DPPR utility 260 further configures the D2D pairing assembly 100 to detect a communicative coupling of a second user device 170 to the second DDC component 127; and communicate the at least one first pairing parameter to the second user device 170, via the second DDC component 127, to trigger the second user device 170 to connect to and participate in a pairing session with the first user device 150 via a direct device-to-device communication medium (see 410, FIG. 4).

It is appreciated that the reference to at least one first pairing parameter is indicative of the fact that a single pairing parameter can be communicated, in some embodiments, while multiple pairing parameters can be communicated in other embodiments. The actual pairing parameter/s can be ones that are pre-programmed for automatic transmission on receipt at the user device of a signal indicating that the user device is in communication with a DDC component of a D2D pairing assembly.

According to one embodiment, the DPPE utility 260 further configures the D2D pairing assembly 100 to: in response to detecting the communicative coupling of the second user device 170, receive from the second user device 170 at least one second pairing parameter associated with the second user device 170, and which uniquely identifies a second user device; and communicate the at least one second pairing parameter to the first user device 150 to enable the first user device 150 to participate in the pairing session with the second user device 170.

In one or more of the described embodiments, the DPPE utility 260 further configures the device-to-device pairing assembly 100 to: in response to completion of a transfer of the at least one first pairing parameter to the second device 170 via the D2D pairing assembly 100, (i) de-couple and/or suspend communication between the first user device 150 and the first DDC component 107 and (ii) de-couple or terminate communication between the second user device 170 and the second DDC component 127. Thus, any subsequent communication and/or content transfer between the first user device 150 and the second user device 170, occurs via the pairing session, and is completed independent of the D2D pairing assembly 100.

When the first pairing of the second user device 170 to the first user device 150 is completed, subsequent pairings of other devices with the first user device 150 can be completed. Thus, as one example, the DPPE utility 260 further configures the device-to-device pairing assembly 100 to: detect a communicative coupling of a third user device with the second DDC component 127 while the first user device is paired to the second user device 170 and is still communicatively coupled to the first DDC component; and in response to detecting the third user device communicatively coupled to the second DDC component 127 while the first user device 150 is still communicatively coupled with the first DDC component 107, communicate a set of pairing parameters received from the first user device 150 to the third user device to enable the third user device to complete device-to-device pairing with the first user device 150. When the pairing of the third device is being established while the first user device 150 and second user device 170 are still paired, the set of pairing parameters provided to the third user device are different pairing parameters than being utilized to complete or conduct the device-to-device pairing of the first user device 150 and second user device 170.

In one or more embodiments, an alternate method of differentiating the two pairings of different devices from each other involves the first user device 150 completing different encoding of the pairing parameters such that each set of pairing parameters provided for each different pairing are differently encoded. Accordingly, the DPPE utility 260 further configures the D2D pairing assembly 100 to: detect a communicative coupling of a third user device to the second DDC component while the first user device 150 is paired to the second user device 170 and is still communicatively coupled to the first DDC component 107; and in response to detecting the third user device communicatively coupled to the second DDC component 127 while the first user device 150 is paired to the second user device 170 and still communicatively coupled to the first DDC component 107, communicate a differently-encoded version of the at least one first pairing parameter that is received from the first user device 150 to the third user device to enable the third user device to complete device-to-device pairing with the first user device 150 using differently-encoded pairing parameters than being utilized to complete the device-to-device pairing of the first user device 150 and second user device 170.

In one embodiment, the pairing functionality and/or pairing configuration of the user devices can be enhanced to support the features described herein. As illustrated in FIGS. 1 and 2, each user device 150 and 170 can include a display 155/175 and a pairing user interface 160/180 that can be opened on display 155/175 during pairing setup and subsequent content exchange. However, it is appreciated that other configurations of user devices can be utilized within the disclosed concepts, including user devices that do not have a display and/or a pairing user interface. In FIG. 2, in addition to these externally visible pairing user interfaces 160/180, first user device 150 also includes a pairing application 210, which includes a first user device identifier (ID) 215 and a pairing configuration setup and notification utility 220 which enables a user of first user device 150 to configure first user device 150 for pairing with another user device. Second user device 170 can be similarly configured as first user device 150 or differently configured. As further shown in FIG. 2, second user device 170 includes a pairing established notification message 230 that can be presented on display 175 or presented as an audible notification, in alternate embodiments.

Figure 3:
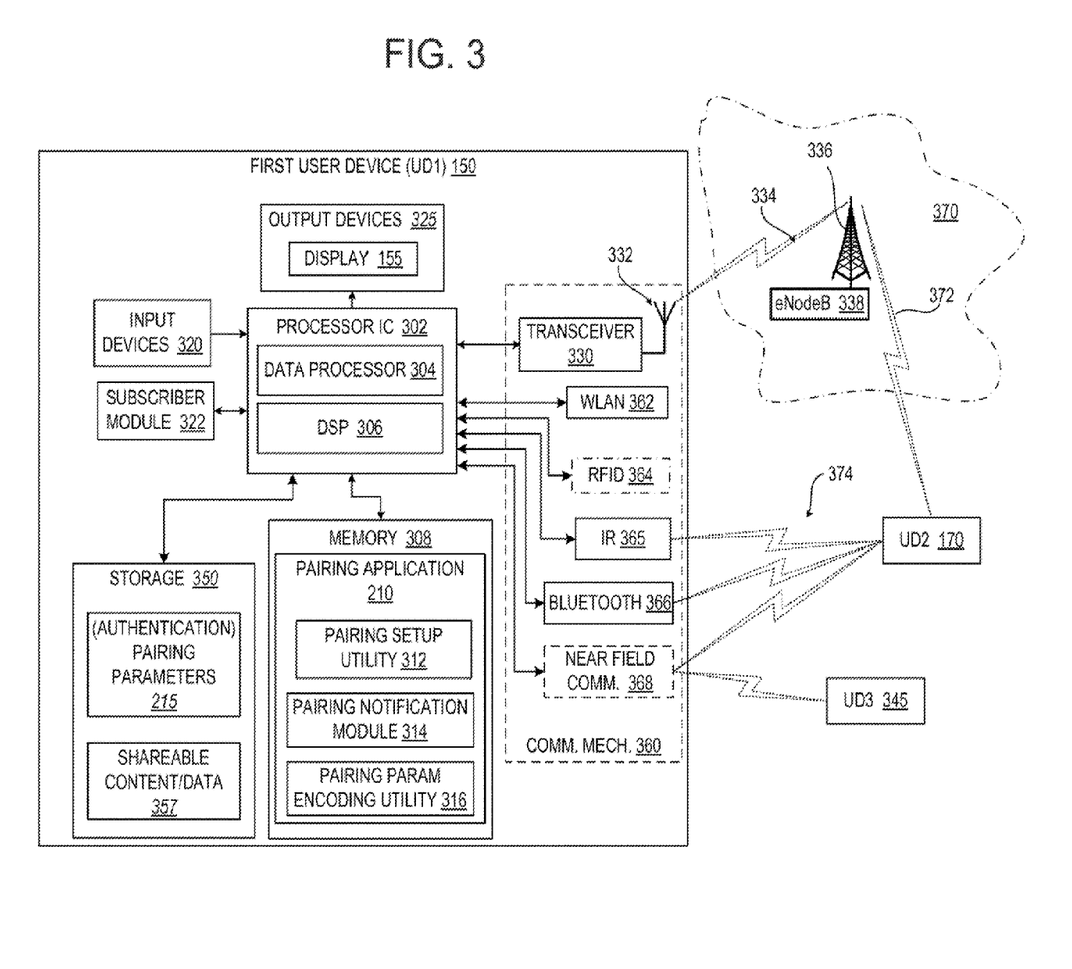
FIG. 3 is a block diagram illustration of a first user device configured with enhanced pairing functionality to support device pairing via the D2D pairing assembly, in accordance with one embodiment.

Referring to FIG. 3, there is presented a block diagram illustration of an example first user device 150 including functional components required to complete device pairing, in accordance with one embodiment. According to the illustration, first user device (UD1) 150 is a communication device that is designed to communicate with other devices via one of a wireless communication network, represented by base station 338 (evolution node B, eNodeB) and antenna 336, and short-range communication components for supporting one or more pairing technologies, e.g., Bluetooth® transceiver 366 and near field communication (NFC) transceiver 368, among others. UD1 150 can be one of a host of different types of devices, including but not limited to, a mobile cellular phone or smart-phone, a laptop, a net-book, an ultra-book, and/or a tablet computing device. These various devices all provide and/or include the necessary hardware and software to enable pairing of UD1 with a second UD (UD2) 170 or third UD (UD3) 345, included various functions associated with establishing and supporting the pairing connection. Additionally, UD1 150 includes the hardware and software or firmware to support the various wireless or wired communication functions.

Referring now to the component makeup and the associated functionality of the presented components, UD1 150 comprises processor integrated circuit (IC) 302, which connects via a plurality of bus interconnects (illustrated by the bi-directional arrows) to a plurality of functional components of UD1 150. Processor IC 302 can include one or more programmable microprocessors, such as a data processor 304 and a digital signal processor (DSP) 306, which may both be integrated into a single processing device, in some embodiments. The processor IC 302 controls the communication, image capture, and other functions and/or operations of UD1 150. These functions and/or operations thus include, but are not limited to, application data processing and signal processing.

Connected to processor IC 302 is memory 308, which can include volatile memory and/or non-volatile memory. One or more executable applications can be stored within memory for execution by data processor 304 on processor IC 302. For example, memory 308 is illustrated as containing pairing application 210, which includes pairing setup utility 312, pairing notification module 314, and pairing parameter encoding utility 316. The associated functionality and/or usage of each of the software modules are generally known, except that the modules can be enhanced to support establishment of a pairing channel that is set up using the D2D pairing assembly and associated functionality described by the present disclosure. It is also appreciated that the various software modules can be independent modules that communicate with each other via processor execution of respective program code.

Also shown coupled to processor IC 302 is storage 350 which can be any type of available storage device capable of storing one or more application software and data. It is further appreciated that in one or more alternate embodiments, the device storage can actually be remote storage and not an integral part of the device itself. As provided, storage 350 contains pairing parameters 215 and shareable data or content 357. The specific usage and/or functionality associated with these components are described in greater detail in the following descriptions.

According to one aspect, pairing setup utility 312 of both UD1 150 and UD2 170 is an enhanced or a modified pairing setup module that enables the functionality of automatically transmitting the at least one first pairing parameter and the at least one second pairing parameter in response to detection of a connection with DDC component 107/127 of a D2D pairing assembly. In one embodiment, DDC component 107/127 transmits a request for return of pairing parameters in response to the detection of the user device establishing a communication with the DDC component 107/127. As one aspect of the disclosure, the paring parameters 215 requested or received from user devices communicatively coupled to the first DDC component 107 can be different from the pairing parameters (if any) requested and/or received from user devices communicatively coupled to the second DDC component 127. Depending on implementation and/or specific design of D2D assembly or configuration of pairing setup utility 312, the pairing parameters 215 can include one of more of: device authentication credentials, pairing channel information, pairing protocol selected from among the technology available and/or supported on the user device, and/or other parameters. It is appreciated that the transmitted paring parameters 215, while described as being at least one or a set of parameters can in the simplest implementation be a single pairing parameter that establishes or identifies the pairing channel or the pairing technology for use in completing the device pairing.

UD1 150 can also comprise a plurality of input/output (I/O) devices, including one or more input devices 320 and/or one or more output devices 325, such as display 155. UD1 150 can also include a subscriber information module (SIM) 322 which can provide unique identification information of the subscriber that owns or utilizes UD1 150, as well as specific contacts and device settings associated with the particular subscriber.

According to one aspect of the disclosure and as illustrated by FIG. 3, UD1 150 supports at least one and potentially many forms of wireless, over-the-air communication, which allows UD1 150 to transmit and receive communication with at least one second device. As a device supporting wireless communication, UD1 150 can be one of, a mobile device a cordless telephone, and a computing device, such as a laptop, tablet, smart phone, personal digital assistant, or other processing devices connected to a wireless modem, to name a few. To support the wireless communication, UD1 150 includes one or more communication components, including wireless transceiver 330 with connected antenna 332, wireless LAN module 362, RFID 364, Infrared 365, Bluetooth® transceiver 366, and near field communication transceiver module 368. Collectively, these wireless components provide a communication mechanism 360 by which UD1 150 can communicate with other devices and networks. For purposes of the following illustrations and associated descriptions thereof, one pairing communication mode is assumed to be NFC, supported by NFC transceiver module 368, while another pairing communication mode is assumed to be Bluetooth®, supported by Bluetooth® transceiver 366.

The wireless communication can be via a standard wireless network, which includes a network of base stations, illustrated by evolution Node B (eNodeB) 338 and associated base station antenna 336. A first over-the-air signal 334 is illustrated interconnecting base station antenna 336 with local antenna 332 of UD1 150. Additionally, communication with the at least one second device (UD2) 170 can be established via near field communication transceiver module 368. In at least one embodiment, UD1 150 can establish a pairing channel with and exchange communication with one or more second devices, of which UD2 170 and UD3 345 are illustrated. As described in further detail below, each of UD2 170 and UD3 345 can be second devices with which UD1 150 can establish a pairing communication channel, using over-the-air signal transmission, following the exchange of specific authentication and/or access credentials. In one embodiment, a single pairing channel can be established with each different short-range communication protocol, and multiple different channels can be established concurrently with multiple second and third devices using the available protocols. Thus, UD2 170 can be paired with UD1 150 using first pairing parameters to connect over Bluetooth® (366), while UD3 345 can be paired with UD1 150 using either different pairing parameters or a differently-encoded version of the first pairing parameters to connect over NFC (368).

Figure 4:
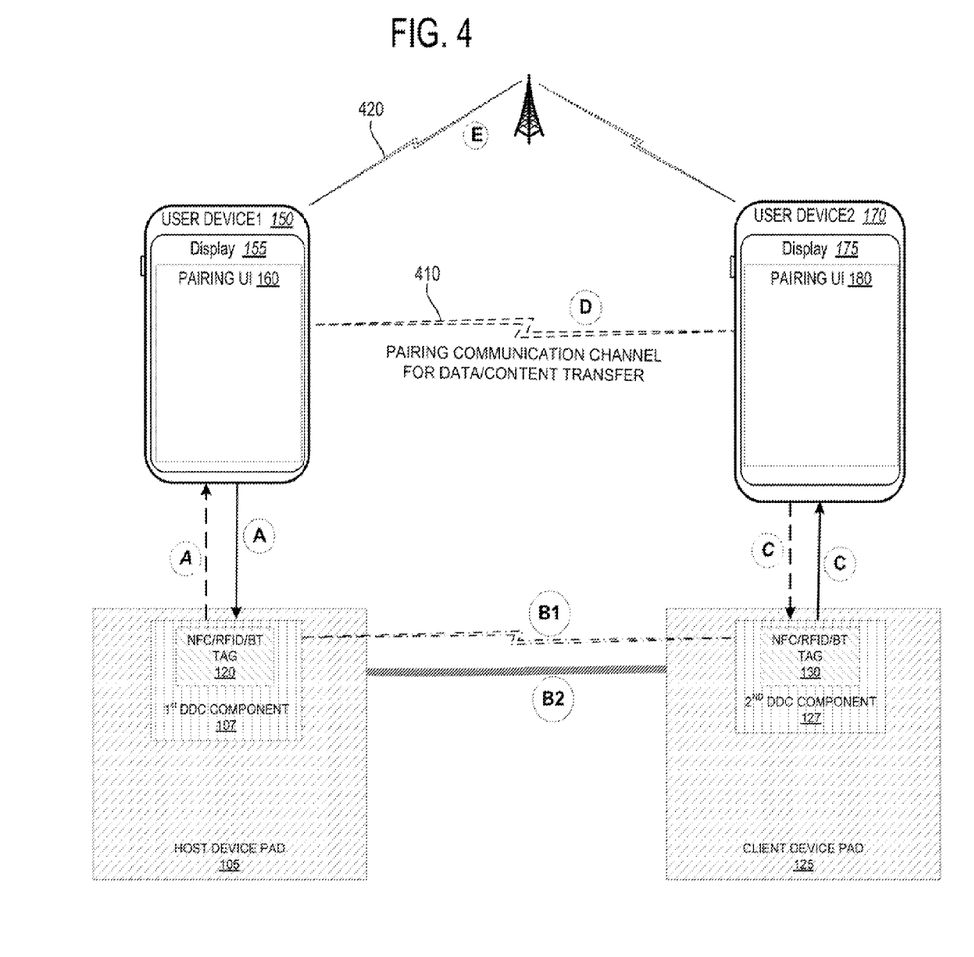
FIG. 4 is a block sequence diagram showing directional flow of communication signals between the first and second user devices and components of the D2D assembly to establish a pairing channel between the user devices, according to one or more embodiments.

FIG. 4 is a block sequence diagram showing directional flow of signal connectivity and/or data exchange between the various user devices and DDC components 107, 127 of D2D pairing assembly, introduced in the preceding figures (FIGS. 1, 2, and 3), according to one or more embodiments. Each communication signal path is labeled with an associated letter A through E, indicating an initial order of communication exchange. Thus, first DDC component 107 generates first communication signal path A which communicatively connects first DDC component 107 with UD1 150. First DDC component 107 requests and/or receives the at least one first pairing parameter from UD1 150 via communication signal path A. Specifically, UD1 150 transmits the at least one first pairing parameter to first DDC component 107 via the established communication channel (A). First DDC component 107 then transfers the received pairing parameter/s via one of wireless communication path, B1, or wired communication path, B2, to second DDC component 127. Second DDC component 127 then transmits the received pairing parameters via communication path C to UD2 170. In at least one embodiment, UD2 170 can also communicate information, such as the at least one second pairing parameter, to second DDC component 127 via communication path C. This reverse communication path is illustrated as italicized C within a dashed circle indicating that this communication is an optional and/or alternate embodiment. Once the above communications are completed over communication paths A, B, and C, and the necessary pairing parameters have been communicated from UD1 150 to UD2 170 and, if necessary, from UD2 170 to UD1 150, communication path C is disconnected and pairing communication channel (path D) 410 is established between UD1 150 and UD2 170. The wireless communication path, D, between UD1 150 and the second user device, UD2, 170 can be established via near field communication, Bluetooth, IR, or other short-range communication technology. Notably, this wireless communication channel (path D) can co-exist along with a network communication path E, comprising over-the-air signals 420 extending from UD1 150 to UD2 170 via wireless network (370, FIG. 3), using one or more intermediary base station antennas. Notably, the establishment of the pairing communication occurs using the D2D pairing assembly to transfer the required pairing parameters between the devices being paired.

Figure 5:
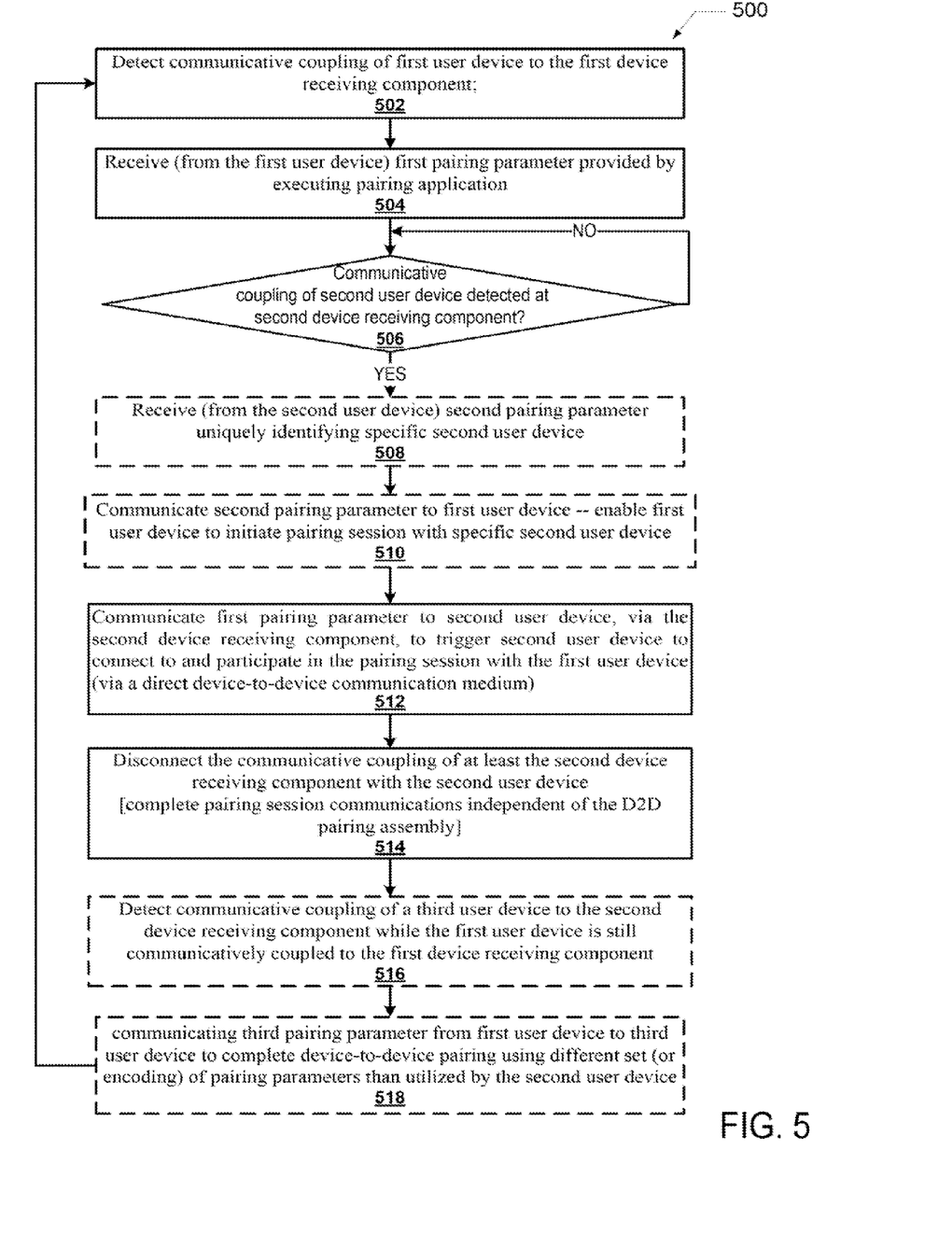
FIG. 5 is a flow chart of a method for completing D2D pairing of user devices utilizing the D2D pairing assembly of FIGS. 1 and 2, according to one or more embodiments.

FIG. 5 is a flow chart of a method for completing D2D pairing utilizing the pairing assembly of FIGS. 1 and 2, with two or more user devices, according to one or more embodiments. The method 500 facilitates pairing of a first user device with a second user device, via use of the D2D pairing assembly. With the descriptions which follow, certain aspects of the methods can be implemented by microprocessor 110 executing program code from DPPE utility 260. Generally, the method 500 can be described as being performed by one or more of D2D pairing assembly 100, microprocessor 110 or execution of a specific utility, e.g., DPPE utility 260, without limitation. Also, method 500 is described with reference to components and features of the preceding figures, FIGS. 1-4, which provide specific examples of the embodiments described by the method.

As illustrated by FIG. 5, method 500 begins at block 502, which provides D2D pairing assembly 100 detecting a communicative coupling of a first user device 150 to the first DDC component 107. At block 504, in response to detecting the communicative coupling of the first user device 150, method 500 includes D2D pairing assembly 100 receiving from the first user device 150 at least one first pairing parameter provided by a pairing application executing on the first user device 150, which first pairing parameter enables another device to connect to and participate in a pairing session with the first user device 150. At decision block 506, method 500 further provides D2D pairing assembly 100 determining whether a communicative coupling of a second user device 170 is detected to second DDC component 127. In response to detecting the communicative coupling of the second user device to the second DDC component 127, method 500 provides: communicating the at least one first pairing parameter to the second user device 170, via the second DDC component 127, to trigger the second user device 170 to connect to and participate in a pairing session with the first user device 150 via a direct device-to-device communication medium (block 512).

According to one embodiment, the method 500 includes the D2D pairing assembly detecting one of (i) a physical placement of the first user device on the first DDC area and (ii) the first user device coming into proximity of and/or within communication range of the first DDC area. Then, in response to the detecting, the method 500 further includes triggering the DDC component to establish a communication with the first user device via a short-range wireless communication protocol supported by the first user device. Similarly detecting and triggering functions are performed to establish the communication with the second user device, when the second DDC component detects the second user device coming into proximity of and/or within communication range of the second DDC area.

In one or more alternate embodiments, and as illustrated by the dashed-line blocks, method 500 can include receiving from the second user device 170 at least one second pairing parameter associated with the second user device 170, and which uniquely identifies the second user device (block 508); and communicating the at least one second pairing parameter to the first user device 150 to enable the first user device 150 to participate in the pairing session with the second user device (block 510).

The pairing session that is established at block 512 involves communication via a pairing channel that is enabled using one of the available close-range communication mechanism and protocols, such as Bluetooth, NFC, or IR, for example. And, once the pairing session parameters are exchanged via the D2D pairing assembly 100, the DPPE utility 260 causes the D2D pairing assembly 100 to disconnect at least one of (a) the communicative coupling of the first DDC component with the first user device 150 and (b) the communicative coupling of the second DDC component with the second user device 170. Specifically, within the process presented by method 500, and as shown at block 514, method 500 includes disconnecting or suspending at least the communicative coupling of the second DDC component with the second user device 170. The disconnection or suspension is triggered to occur in response to completion of a transfer of at least the first pairing parameter via the D2D pairing assembly. Following this disconnection, subsequent exchanges of communication, including information transfer between the first user device and the second user device, occur via the pairing session, independent of the D2D pairing assembly. It is appreciated that the disconnection may be triggered in response to a user removing the first device and/or the second device away from within the communication range of the respective DDC component.

Following block 514, method 500 can optionally include detecting a communicative coupling of a third user device to the second DDC component while the first user device is paired to the second user device and still communicatively coupled to the first DDC component (block 516). Then, in response to detecting the third user device communicatively coupled to the second DDC component while the first user device is paired to the second user device and still communicatively coupled to the first DDC component, method 500 optionally includes communicating a third pairing parameter received from the first user device to the third user device to enable the third user device to complete device-to-device pairing with the first user device using different pairing parameters than being utilized to complete the device-to-device pairing of the first user device and second user device (block 518). These optional processes are illustrated by dashed boxes within method 500. According to one or more embodiments, the third pairing parameter is an encoded copy of the first pairing parameter, and the method 500 then includes communicating a differently-encoded version of the first pairing parameter that is received from the first user device to the third user device to enable the third user device to complete device-to-device pairing with the first user device using differently-encoded pairing parameters than being utilized to complete the device-to-device pairing of the first user device and second user device. Method 500 then ends.

In the flow chart presented herein, certain functions and/or processes of the methods can be combined, performed simultaneously or in a different order, or perhaps omitted, without deviating from the spirit and scope of the described innovation. While the method functions or processes are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A device-to-device (D2D) pairing assembly comprising:
   a first device detecting and communicating (DDC) component;
   a second DDC component communicatively coupled to the first DDC component;
   a hardware processor communicatively coupled to the first DDC component and to the second DDC component and which is configured with a device pairing parameter exchange (DPPE) utility that executes on the hardware processor and configures the D2D pairing assembly to:
      detect a communicative coupling of a first user device to the first DDC component;
      in response to detecting the communicative coupling of the first user device, receive from the first user device at least one first pairing parameter provided by a pairing application executing on the first user device and cause the first user device to allow additional devices to communicate with the first user device in a pairing session over a communication channel with the at least one first pairing parameter;
      detect a communicative coupling of a second user device to the second DDC component, wherein the second user device has at least one second pairing parameter provided by the pairing application executing on the second user device;
      communicate the at least one first pairing parameter to the second user device, via the second DDC component, and the at least one second pairing parameter to the first device, via the first DDC component, to cause the first user device and the second user device to connect to and participate in the pairing session over the communication channel.

2. The D2D pairing assembly of claim 1, wherein the DPPE utility further configures the device-to-device pairing assembly to:
   in response to completion of a transfer of the at least one first pairing parameter via the D2D pairing assembly, de-couple communication between the first user device and the first DDC component and de-couple communication between the second user device and the second DDC component, wherein a subsequent exchange of communication, including information transfer between the first user device and the second user device, occurring via the pairing session, is completed independent of the D2D pairing assembly.

3. The D2D pairing assembly of claim 1, wherein the DPPE utility further configures the device-to-device pairing assembly to:
   detect a communicative coupling of a third user device to the second DDC component while the first user device is paired to the second user device and still communicatively coupled to the first DDC component; and
   in response to detecting the third user device communicatively coupled to the second DDC component while the first user device is paired to the second user device and still communicatively coupled to the first DDC component, communicate at least one different pairing parameter received from the first user device to the third user device to enable the third user device to complete device-to-device pairing with the first user device using at least one different pairing parameter than being utilized to complete the device-to-device pairing of the first user device and second user device.

4. The D2D pairing assembly of claim 1, wherein the DPPE utility further configures the device-to-device pairing assembly to:
   detect a communicative coupling of a third user device to the second DDC component while the first user device is paired to the second user device and still communicatively coupled to the first DDC component; and
   in response to detecting the third user device communicatively coupled to the second DDC component while the first user device is paired to the second user device and still communicatively coupled to the first DDC component, communicate a differently-encoded version of the at least one first pairing parameter that is received from the first user device to the third user device to enable the third user device to complete device-to-device pairing with the first user device using at least one differently-encoded pairing parameter than being utilized to complete the device-to-device pairing of the first user device and second user device.

5. The D2D pairing assembly of claim 1, further comprising:
   an underlying pad that identifies a perimeter of the device-to-device pairing assembly;
   a first device pad on which the first user device can be placed;
   a second device pad on which the second user device can be placed; and
   electronic circuitry associated with the first and second device pads which enable at least one of a wireless signal communication between the first device pad and the second device pad and direct communication via a communication bus extending between the first device pad and the second device pad.

6. The D2D pairing assembly of claim 5, wherein the electronic circuitry comprises: a first DDC data transmitter that transmits pairing parameters that are received from the first user device; and a second DDC data receiver for receiving pairing parameters transmitted from the first device pad.

7. The D2D pairing assembly of claim 6, wherein the first DDC data transmitter is a component of a first DDC data transceiver and the second DDC data receiver is a component of a second DDC data transceiver for bi-directional transfer of pairing information between a first user device and a second user device communicatively coupled to respective ones of the first DDC component and the second DDC component.

8. The D2D pairing assembly of claim 1, wherein:
the first DDC component comprises a first data receiver and a first data transmitter, which respectively receives the at least one first pairing parameter and transmits the received at least one first pairing parameter to the second DDC component; and
the second DDC component comprises a second data receiver that receives the at least one first pairing parameter from the first DDC component and a second data transmitter that transmits the at least one first pairing parameter to the second user device from the second DDC component.

9. The D2D pairing assembly of claim 8, wherein:
the first data receiver DDC is one of a radio frequency identifier (RFID) receiver and a near field communication (NFC) receiver; and
the second data transmitter DDC is one of a radio frequency identifier (RFID) transmitter and a near field communication (NFC) transmitter.

10. A method for facilitating pairing of a first user device with a second user device, the method comprising:
detecting a communicative coupling of a first user device to a first device detecting and communicating (DDC) component;
in response to detecting the communicative coupling of the first user device, receiving from the first user device at least one first pairing parameter provided by a pairing application executing on the first user device and cause the first user device to allow additional devices to communicate with the first user device in a pairing session over a communication channel with the at least one first pairing parameter;
detecting a communicative coupling of a second user device to a second DDC component that is communicatively coupled to the first DDC component on a device-to-device (D2D) pairing assembly, wherein the second user device has at least one second pairing parameter provided by the pairing application executing on the second user device;
communicating the at least one first pairing parameter to the second user device, via the second DDC component, and the at least one second pairing parameter to the first device, via the first DDC component, to cause the first user device and the second user device to connect to and participate in the pairing session over the communication channel.

11. The method of claim 10, further comprising:
in response to completion of a transfer of the at least one first pairing parameter via the D2D pairing assembly:
disconnecting the communicative coupling of the first DDC component with the first user device; and
disconnecting the communicative coupling of the second DDC component with the second user device;
wherein a subsequent exchange of communication, including information transfer between the first user device and the second user device, occurring via the pairing session, is completed independent of the D2D pairing assembly.

12. The method of claim 10, further comprising:
while the first user device is paired to the second user device and still communicatively coupled to the first DDC component; and
in response to detecting the third user device communicatively coupled to the second DDC component while the first user device is paired to the second user device and still communicatively coupled to the first DDC component, communicating to the third user device at least one different pairing parameter received from the first user device to enable the third user device to complete device-to-device pairing with the first user device using at least one different pairing parameter than being utilized to complete the device-to-device pairing of the first user device and second user device.

13. The method of claim 10, further comprising:
detecting a communicative coupling of a third user device to the second DDC component while the first user device is paired to the second user device and still communicatively coupled to the first DDC component; and
in response to detecting the third user device communicatively coupled to the second DDC component while the first user device is paired to the second user device and still communicatively coupled to the first DDC component, communicating a differently-encoded version of at least one of the at least one first pairing parameter that is received from the first user device to the third user device to enable the third user device to complete device-to-device pairing with the first user device using at least one differently-encoded pairing parameter than being utilized to complete the device-to-device pairing of the first user device and second user device.

14. The method of claim 10, wherein the device-to-device pairing assembly comprises:
an underlying pad that identifies a perimeter of the device-to-device pairing assembly;
a first device pad on which the first user device can be place;
a second device pad on which the second user device can be placed; and
electronic circuitry associated with the first and second device pads which enables at least one of a wireless signal communication between the first device pad and the second device pad and direct communication via a communication bus extending between the first device pad and the second device pad.

15. The method of claim 14, wherein the electronic circuitry comprises:
a first DDC data transmitter that transmits pairing parameters that are received from the first user device; and
a second DDC data receiver for receiving the pairing parameters transmitted from the first device pad.

16. The method of claim 10, wherein the first DDC data transmitter is a component of a first DDC data transceiver and the second DDC data receiver is a component of a second DDC data transceiver for bi-directional transfer of pairing information between a first user device and a second user device communicatively coupled to respective ones of the first DDC component and the second DDC component.

17. The method of claim 16, wherein:
the first DDC component comprises a first data receiver and a first data transmitter, which respectively receives the at least one first pairing parameter and transmits the received at least one first pairing parameter to the second DDC component; and
the second DDC component comprises a second data receiver that receives the at least one first pairing parameter from the first DDC component and a second data transmitter that transmits the at least one first pairing parameter to the second user device from the second DDC component.

18. The method of claim 17, wherein:
the first data receiver is one of a radio frequency identifier (RFID) receiver and a near field communication (NFC) receiver; and
the second data transmitter is one of a radio frequency identifier (RFID) transmitter and a near field communication (NFC) transmitter.

19. The method of claim 10, further comprising:
detecting, using the D2D pairing assembly, one of (i) a physical placement of the first user device on the first DDC area and (ii) the first user device coming into proximity of and/or within communication range of the first DDC area; and
in response to the detecting, triggering the first DDC component to establish a communication with the first user device via a short-range wireless communication protocol supported by the first user device.

* * * * *